(12) United States Patent
Baudelocque et al.

(10) Patent No.: US 7,986,070 B2
(45) Date of Patent: Jul. 26, 2011

(54) OVERMOULDED OR CANNED ELECTRICAL MACHINE

(75) Inventors: Luc Baudelocque, Vernon (FR); Maurice Brunet, Sainte Colombe Pres Vernon (FR)

(73) Assignee: Societe de Mecanique Magnetique, Saint Marcel (FR)

( * ) Notice: Subject to any disclaimer, the term of this patent is extended or adjusted under 35 U.S.C. 154(b) by 0 days.

(21) Appl. No.: 12/518,503

(22) PCT Filed: Dec. 13, 2007

(86) PCT No.: PCT/FR2007/052497
§ 371 (c)(1),
(2), (4) Date: Aug. 18, 2009

(87) PCT Pub. No.: WO2008/084157
PCT Pub. Date: Jul. 17, 2008

(65) Prior Publication Data
US 2010/0295395 A1 Nov. 25, 2010

(30) Foreign Application Priority Data
Dec. 14, 2006 (FR) ...................................... 06 55515

(51) Int. Cl.
*H02K 3/48* (2006.01)

(52) U.S. Cl. .............................. 310/214; 310/86; 310/43

(58) Field of Classification Search ................... 310/86, 310/181, 214, 43
See application file for complete search history.

(56) References Cited

U.S. PATENT DOCUMENTS

| | | | | |
|---|---|---|---|---|
| 2,428,236 A * | 9/1947 | Maxwell | ......................... | 310/86 |
| 2,428,816 A * | 10/1947 | Sigmund et al. | ................ | 310/86 |
| 2,654,848 A * | 10/1953 | Schaefer | ......................... | 310/86 |
| 2,698,911 A * | 1/1955 | Schaefer | ......................... | 310/86 |
| 3,560,776 A * | 2/1971 | Kildishev et al. | ............. | 310/214 |
| 3,984,711 A * | 10/1976 | Kordik | ....................... | 310/49.46 |
| 5,698,917 A * | 12/1997 | Shultz | ............................. | 310/87 |

* cited by examiner

*Primary Examiner* — Dang D Le
(74) *Attorney, Agent, or Firm* — Weingarten, Schurgin, Gagnebin & Lebovici LLP

(57) ABSTRACT

A rotary electric machine having at least one piece of electric equipment constituted by an overmolded or jacketed electric motor or by an overmolded or jacketed magnetic suspension system; the electric equipment including firstly a rotor (102) and secondly a stator (150) having pole pieces (154) and coils (152); the stator (150) being provided with at least one jacket (101) or coating (190) to protect it against an aggressive environment, on its face situated facing the rotor (102); the protective jacket (101) or coating (190) on the face of the stator (150) facing the rotor (102) presenting set-back portions (111) set back from the main surfaces (155) defining the airgap (e), these set-back portions (111) being distributed around the stator; and the movement of fluid circulating in the airgap around the rotor (102) being thus enhanced.

15 Claims, 4 Drawing Sheets

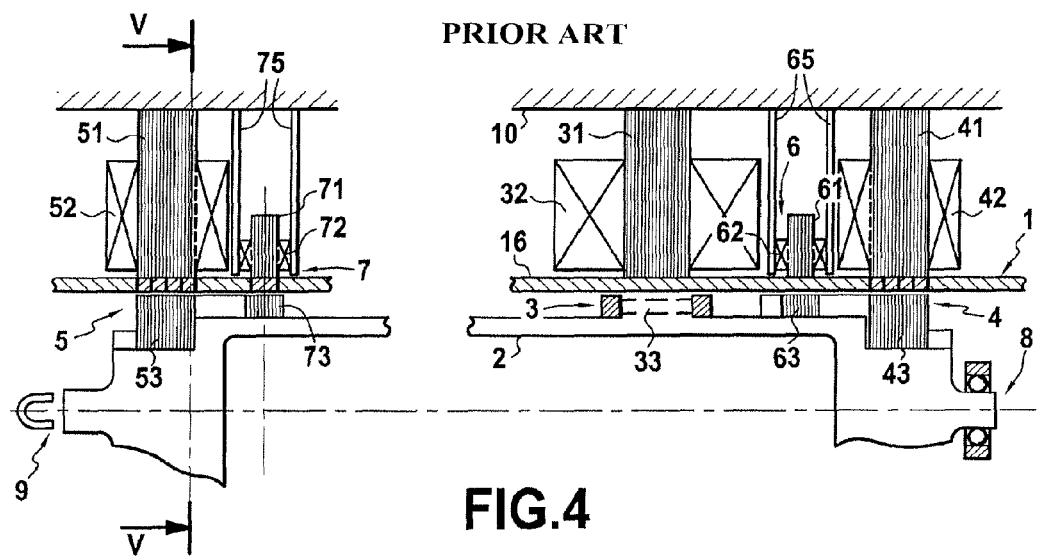
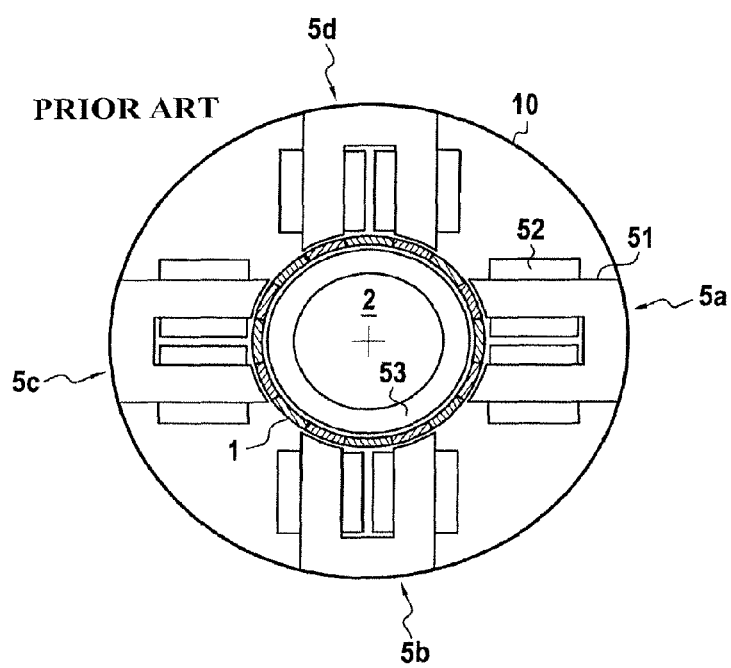

OVERMOULDED OR CANNED ELECTRICAL MACHINE

The present invention relates to a rotary electric machine comprising at least one piece of electric equipment constituted by an overmolded electric motor or an overmolded magnetic suspension system, said electric equipment comprising firstly a rotor and secondly a stator having pole pieces and coils surrounding the pole pieces, the stator being fitted with at least one protective coating for protection against an aggressive environment on its face situated facing the rotor and defining an airgap situated between the stator and the rotor.

More particularly, a device is already known for magnetically suspending a rotor relative to a structure, the device comprising at least one active magnetic bearing with at least one electromagnet stator coil connected by connection wires to circuits for servo-controlling the position of the rotor on an equilibrium position, and means for controlling the temperature of the electromagnet stator coil, the device being protected from the environment by a jacket or by overmolding.

In a conventional configuration, such a disposition presents the drawback of reducing the airgaps between the stator and the rotor and of creating a gas sealing effect that hinders flow of the cooling fluid (high density gas) in the airgap, while also encouraging the creation of stiffnesses and damping both direct and crossed (the fluid bearing effect) damping that are harmful to the stability of the suspension and that encourage sub-synchronous frequencies to appear of the kind commonly observed in turbomachines, while also giving rise to the effects of added mass.

These phenomena of crossed stiffnesses and damping are similar to the phenomena encountered in the labyrinth fields of turbomachines and their harmful effects are well known to all manufacturers of compressors.

In the prior art, protecting a magnetic bearing or an electric motor against an aggressive environment by means of a jacket or by a coating is provided in the form of a regular cylinder. The airgap between the cylinder and the rotor is of the order of 0.5 millimeters (mm) to 1 mm for a magnetic bearing, and 1 mm to 10 mm for a motor.

The total length of the cylinder may lie in the range a few centimeters to a few tens of centimeters. The destabilizing effects of the gas increase with increasing density of the gas (at high pressure), and with decreasing airgap, and with increasing length.

FIGS. 4 and 5 show an example of a magnetic suspension device for a rotor placed in a prior art sealed enclosure, of the kind described in patent document EP 0 097 590 A1.

FIG. 4 thus shows a motor 2 placed inside a sealed enclosure 1 and supported without contact with the help of magnetic bearings 4, 5 having their stators mounted on a structure 10.

An electric motor 3 for driving the rotor 2 comprises an armature 33 mounted on the rotor 2 and a stator or field coil secured to the structure 10 and comprising a core 31 and excitation coils 32.

The sealed enclosure 1 is interposed between the armature 33 and the core 31 which is made up of a stack of laminations with pole-defining ends in contact with the wall 16 of the enclosure 1, while an empty space is left between the armature 33 and the wall 16.

Each magnetic bearing 4, 5 has both an annular armature 43, 53 of laminated magnetic material mounted on the rotor 2 and a stator 41, 51 fastened to the structure 10. The stator 41, 51 is constituted by electromagnets 5$a$, 5$b$, 5$c$, and 5$d$ that are regularly distributed around the theoretical position of the axis of the shaft 2, and including a yoke 41, 51 associated with the coils 42, 52, each yoke 41, 51 defining pole pieces that terminate in the immediate vicinity of the sealed enclosure where they face the corresponding annular armature 43, 53, an airgap being left between the enclosure 1 and the armature 43, 53.

Detectors 6 and 7 for detecting the radial position of the rotor 2 are associated with the magnetic bearings 4 and 5 and also with servo-control circuits (not shown) for stabilizing the position of the rotor 2 which is supported solely by electromagnetic means, the ball bearings 8 being present only for emergency use and presenting transverse clearance that is slightly smaller than the clearance that exists between the rotor 2 and the stators of the magnetic bearings 4 and 5, and between the motor 3 and the radial detectors 6 and 7.

By way of example, the position detectors 6 and 7 may be of the electromagnetic type, each having an annular armature 63, 73 disposed on the rotor 2 and a stator constituted by a yoke 61, 71 together with windings 62, 72, the stator being secured to the structure 10 by connection elements 65 and 75, for example. The sealed enclosure is disposed between the stator of each detector and the corresponding annular armature 63 or 73. FIG. 4 also shows an axial detector 9.

The present invention seeks to remedy the above-mentioned drawbacks and to enable a genuine flow of gas to be established along and inside cylinders defining an airgap between a rotor and a stator in order to reduce significantly the unstable effects that are due to gas.

The invention thus seeks to make it possible to protect an electric machine comprising a rotor and a stator, such as an electric motor or a magnetic suspension system having coils, against the aggressivity of the environment by overmolding the stator or by jacketing it using a jacket of any kind, magnetic or non-magnetic, conductive or non-conductive, so as to avoid the destabilizing consequences of conventional configurations.

In general, the present invention seeks to avoid the major destabilizing effects that can sometimes be completely unacceptable for rotary electric machines working in high density fluids that are highly corrosive, which effects are due to small airgaps between the stator and the rotor, to high fluid pressures, and to high speeds of rotor rotation.

According to the invention, these objects are achieved by a rotary electric machine comprising at least one piece of electric equipment constituted by an overmolded electric motor or an overmolded magnetic suspension system, said electric equipment comprising firstly a rotor and secondly a stator having pole pieces and coils surrounding the pole pieces, the stator being fitted with at least one protective coating for protection against an aggressive environment on its face situated facing the rotor and defining an airgap situated between the stator and the rotor, the electric machine being characterized in that the protective coating fitted on the face of the stator facing the rotor presents set-back portions that are set back from the main surfaces defining the airgap, said set-back portions being distributed around the stator and occupying only some of the slots formed between the pole pieces.

By forming set-back portions in the protective coating fitted on the face of the stator that faces the rotor, which portions are set back from the main surfaces that define the airgap, in particular the following advantages are obtained:

the set-back portions provide a larger passage for passing the cooling fluid and therefore provide a significant improvement in temperature conditions;

the set-back portions serve to prevent the gas from forming a film that rotates at a speed less than or equal to the speed of rotation of the rotor, where such a film often gives rise to a sub-synchronous excitation phenomenon of the kind commonly observed in turbomachines at their gas seals; and the set-back portions enable the volume surrounding the rotor to be increased and they therefore facilitate the movement of gas around the rotor when the rotor moves radially, thereby significantly reducing the direct and crossed stiffnesses and damping due to the effects of the gas, and also reducing the added mass effects.

In a first embodiment of the invention, the set-back portions are formed with the help of overmolding covering all of the coils of the stator while filling the space left between the pole pieces of the stator in part only, whereby the free surface of the overmolding defining the set-back portions forms steps relative to the end surfaces of the pole pieces.

In a second embodiment of the invention, the electric machine includes overmolding that covers all of the coils of the stator and that is made up to the level of the end surfaces of the pole pieces, with grooves being formed in the overmolding between at least some of said pole pieces so as to form the set-back portions.

In a third embodiment of the invention, the electric machine includes a jacket defining crenellated portions that extend into the slots defined between at least some of the pole pieces so as to form the above-mentioned set-back portions.

When the electric machine includes overmolding with grooves, the crenellated portions of the jacket are disposed in the grooves formed in the overmolding.

In a preferred embodiment, the jacket is made of an electrically conductive material, and the crenellated portions of the jacket are located in zones corresponding to every other slot amongst the slots formed between the pole pieces.

In a fourth embodiment, the stator comprises at least two independent sectors that are overmolded and jacketed in independent manner, and said set-back portions are formed by empty spaces left between the independent sectors.

The electric machine may include at least two independent sectors.

Nevertheless, and preferably, it may have four or eight independent sectors defining empty spaces therebetween constituting said set-back portions.

The rotary electric machine may comprise a piece of electric equipment constituted by a radial magnetic bearing or, in the first three embodiments, it may equally well be constituted by an electric motor.

Other characteristics and advantages of the invention appear from the following description of particular embodiments, given by way of example and with reference to the accompanying drawings, in which:

FIG. 4 is an axial half-section view of an example of an electromagnetic suspension for a rotor placed inside a leak-tight enclosure, in a prior art embodiment; and FIG. 5 is a section view on line V-V of FIG. 4 showing the structure of a prior art radial magnetic bearing.

Figure 1:
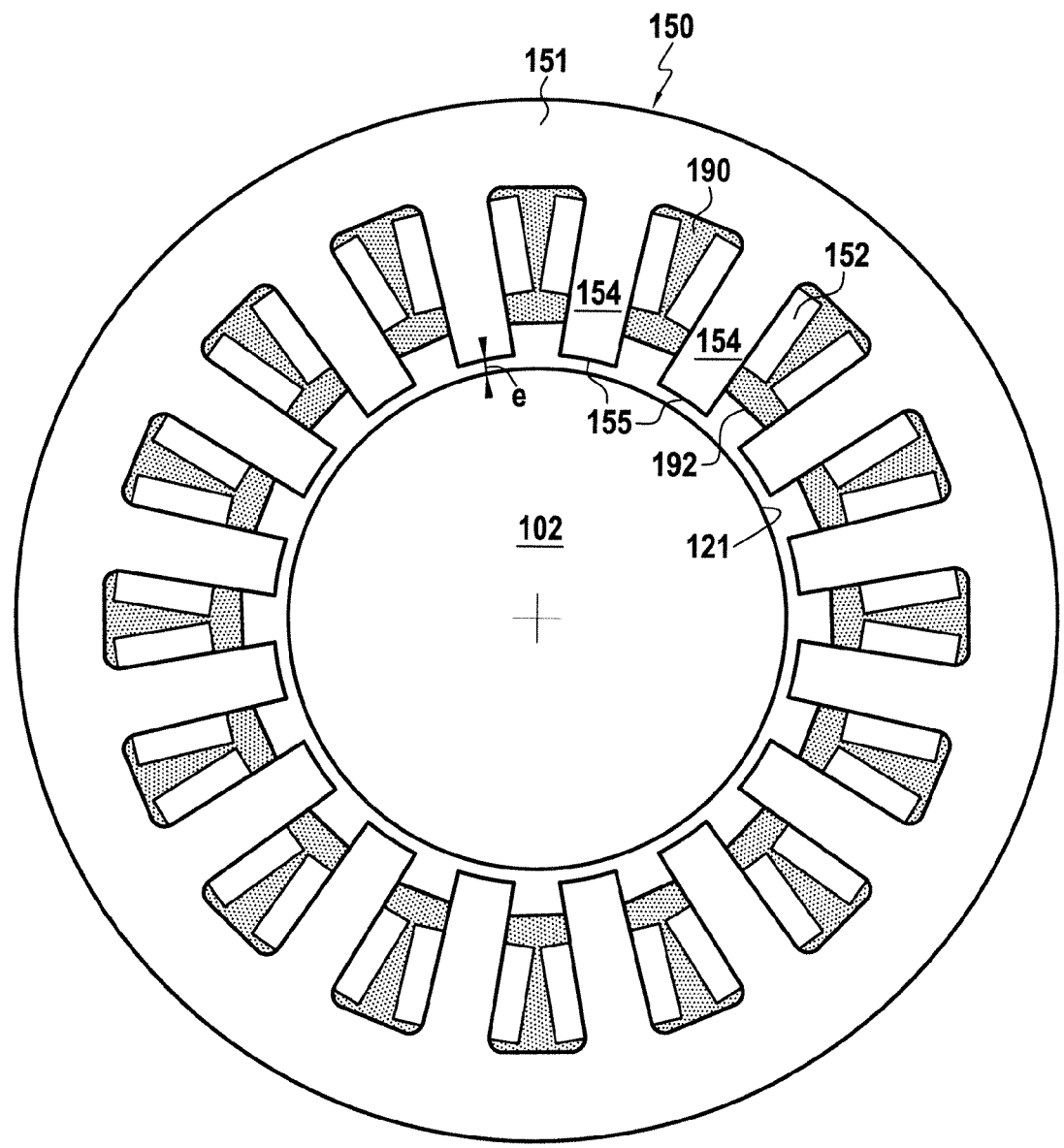
FIG. 1 is a section view on a plane perpendicular to the axis of an electric machine constituting a first embodiment of the invention, in which the stator of the machine is provided with overmolding.

FIG. 1 is a view of rotary machine electric equipment that may be a radial magnetic bearing or an electric motor, and that comprises firstly a rotor 102 fitted with an armature 121, and secondly a stator 150.

The stator 150 comprises a yoke 151 of laminated magnetic material that presents pole pieces 154 having ends 155 that are located at a short distance from an annular armature 121 disposed at the periphery of the rotor 102. An airgap e is thus defined between the ends 155 of the pole pieces 154 of the stator 150 and the armature 121 of the rotor 102.

Coils 152 surround the pole pieces 154 and a protective coating 190 is overmolded on the pole pieces 154 and the coils 152.

Nevertheless, in accordance with the invention, the overmolding 190 coating all of the coils 152 of the stator 150 fills the spaces formed between the pole pieces 154 of the stator 150 in part only so that the free surface of the overmolding 190 is set back from the end surfaces 155 of the pole pieces 154, thereby defining set-back portions 192 between said pole pieces 154, which set-back portions 192 are distributed around the stator 150. These set-back portions 192 serve to improve the flow of cooling fluid between the armature 121 of the rotor and the face of the stator that faces said armature 121. Temperature conditions are thus improved and the cooling gas is prevented from forming a film that rotates inside the airgap at a speed that is less than or equal to the speed of rotation of the rotor, thereby reducing sub-synchronous excitation phenomena, in particular. Increasing the volume that surrounds the rotor makes it easier in general for gas to move about the rotor and reduces the parasitic stiffnesses and damping provided by fluid effects.

Figure 2:
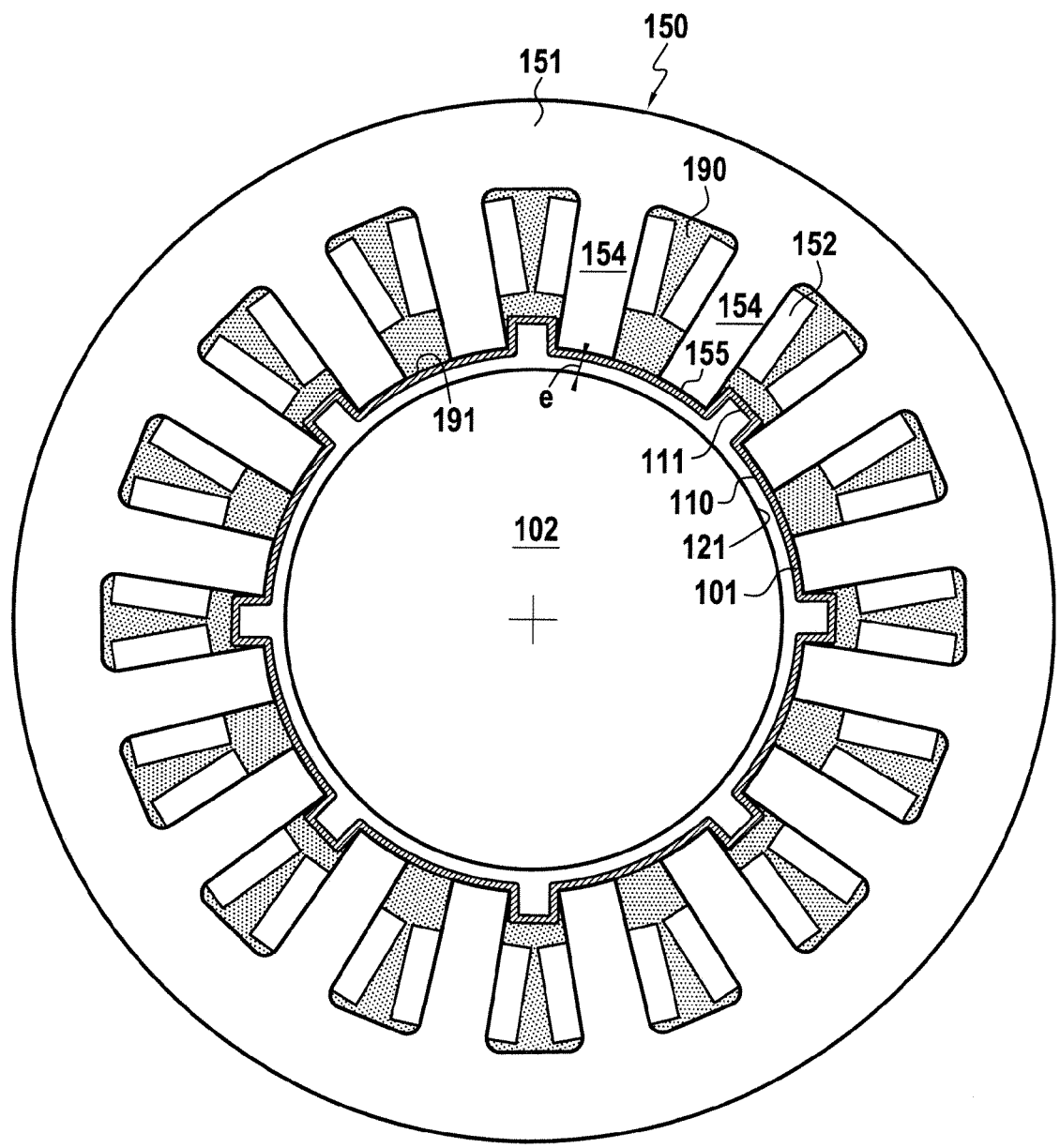
FIG. 2 is a section view on a plane perpendicular to the axis of an electric machine constituting a second embodiment of the invention, in which the stator of the machine is provided both with overmolding and with jacketing.

FIG. 2 shows a second possible embodiment in which the overmolding 190 coating all of the coils 152 of the stator 150 is made up to the level of the end surfaces 155 of the pole pieces 154. In this example, grooves are formed in the overmolding 190 between all or some of the pole pieces 154.

As shown in FIG. 2, the overmolding 190 comes flush with the level of the end surfaces 155 of the pole pieces 154 in zones 191 that correspond to every other slot amongst the slots formed between the pole pieces 154.

In FIG. 2, the stator of the electric motor of the magnetic bearing includes not only protective coating 190 overmolded on the coils 152, but also a hermetically sealed jacket 101 for protecting the stator from the aggressive fluid flowing in the airgap e between the stator and the armature 121 of the rotor 102.

Under such circumstances, the jacket 101 has cylindrical portions 110 that fit closely over the overmolding 190 and the end surfaces 155 of the pole pieces 154, and crenellated portions 111 that project into the slots in which grooves were formed during overmolding 190.

The set-back portions increase the volume available for fluid flow in the airgap between the armature 121 of the rotor 102 and the jacket 101.

The internal overmolding 190 prevents the jacket 101 from deforming under the effect of pressure. This precaution is needed to avoid generating mechanical stress in the jacket, since such mechanical stress gives rise to a fatigue effect in the jacket, thereby reducing its lifetime in terms of pressurization and depressurization cycles. Furthermore, such stresses reduce resistance to corrosion.

Under all circumstances, it is important for the crenellated portions 111 of the jacket 101 of electrically conductive material (e.g. stainless steel) to be formed in every other slot amongst the slots defined between the poles 154, as shown in FIG. 2, so that two poles 154 of a given magnetic circuit are contained between two crenellated portions 111 or teeth of the jacket 101. This serves to avoid forming a short circuit turn on each of the poles 154, thereby avoiding an obstacle to flux variation that would reduce or eliminate the passband of the magnetic bearing.

The jacket 101 is preferably made of a magnetically-conductive material so as to reduce the magnetic airgap e of the bearing, but that is not absolutely essential.

Figure 3:
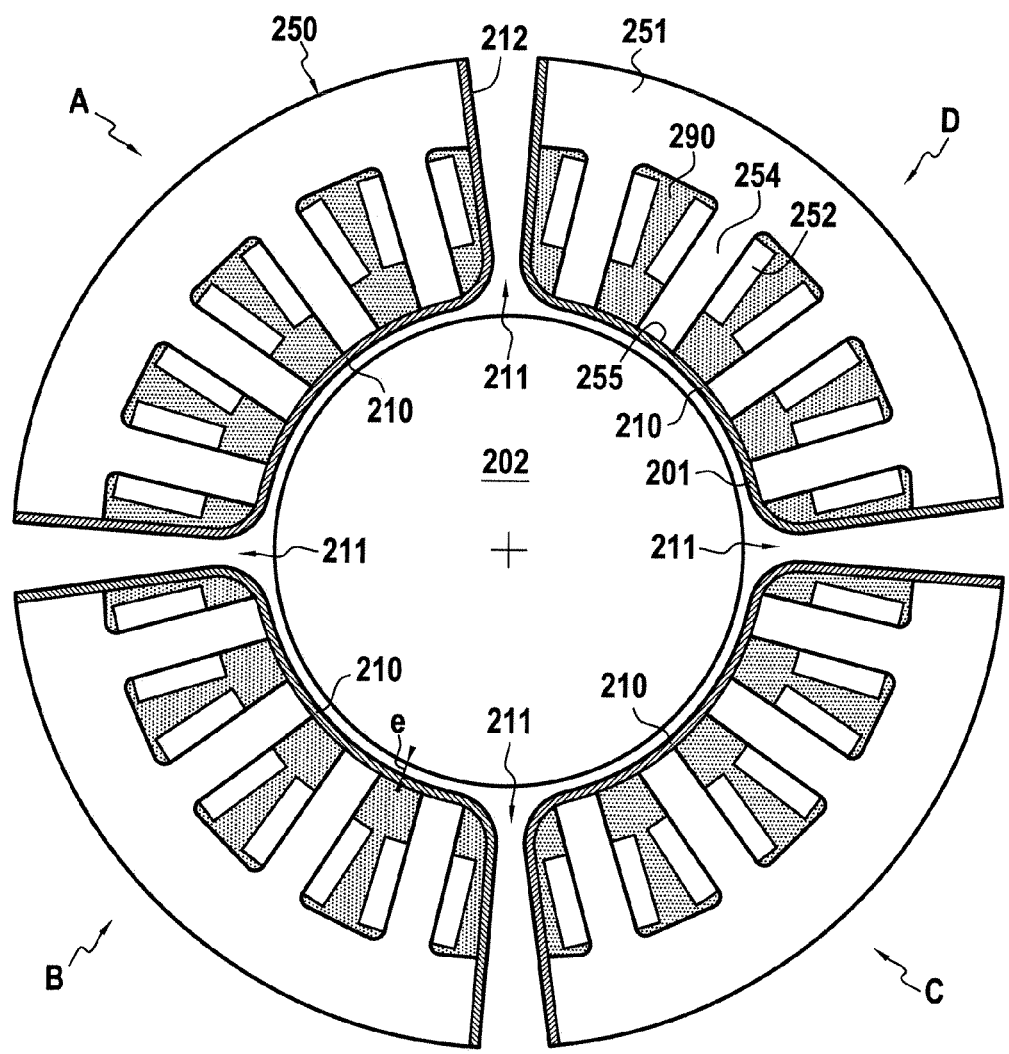
FIG. 3 is a section view on a plane perpendicular to the axis of a radial magnetic bearing constituting yet another embodiment of the invention, in which the rotor comprises four independent quadrants.

FIG. 3 shows yet another embodiment of the present invention, in which a radial magnetic bearing comprises a plurality of independent sectors A, B, C, and D, each having overmolding 290 and/or a jacket 201 made independently for each sector A, B, C, and D, and leaving empty spaces 211 between sectors that form set-back portions enabling the gaseous fluid that flows between the rotor 202 and the portions 210 of the jackets that fit closely over the end portions 255 of the pole pieces 254 to benefit from some additional volume, as in the above-described embodiments.

In the embodiment of FIG. 3, each sector A, B, C, or D of the stator 250 can be made in the same manner with a yoke 251 of laminated magnetic material defining pole pieces 254 that are surrounded by excitation coils 252. Each sector A, B, C, and D may be provided with overmolding 290 for protecting the coils 252, filling all of the slots between its pole pieces 254 and coming up flush with the level of the end portions 255 of the pole pieces 254.

Alternatively, each sector A, B, C, and D may have a jacket 201 that comprises a main portion 210 protecting the end portions 255 of the pole pieces 254 and closing the slots formed between the pole pieces 254, together with side portions 212 that protect the ends of the sectors A, B, C, and D, by defining the above-mentioned passages 211 between pairs of adjacent sectors, which passages are in communication with the fluid flow space defined between the stator sectors A, B, C, and D, and the rotor 202.

As shown in FIG. 3, a single bearing may have stator sectors A, B, C, and D that have both overmolding 290 and jackets 201. The invention thus covers a bearing made up of independent sectors, each capable of being fitted in independent manner either with overmolding 290, or with a jacket 201, or with a combination of overmolding 290 and a jacket 201, the sectors being assembled together in such a manner as to leave fluid flow spaces between them.

The stator may comprise two independent sectors leaving two empty spaces 211 between them. Nevertheless, it is advantageous to make a bearing out of four independent quadrants A, B, C, and D, as shown in FIG. 3, leaving four empty spaces 211 between the quadrants. Other embodiments with some other number of sectors, e.g. three sectors or eight sectors, are also possible without going beyond the ambit of the present invention.

In general, the measures recommended in the context of the present invention make it possible to maintain an airgap e of small value, e.g. lying in the range 0.5 mm to 1 mm in a magnetic bearing, or 1 mm to 10 mm in an electric motor, while avoiding the destabilizing effects associated with high pressures and high speeds for jacketed or overmolding rotary electric machines for operation with a high density gas or some other type of fluid flowing in the airgap.

In the above description, the term "electric motor" also covers the circumstance in which such electrical equipment operates as a generator.

The invention claimed is:

1. A rotary electric machine comprising at least one piece of electric equipment constituted by an overmolded electric motor or an overmolded magnetic suspension system, said electric equipment comprising firstly a rotor and secondly a stator having pole pieces and coils surrounding the pole pieces, the stator being fitted with at least one protective coating for protection against an aggressive environment on its face situated facing the rotor and defining an airgap (e) situated between the stator and the rotor, the electric machine being characterized in that the protective coating fitted on the face of the stator facing the rotor presents set-back portions that are set back from the main surfaces defining the airgap (e), said set-back portions being distributed around the stator and occupying only some of the slots formed between the pole pieces.

2. An electric machine according to claim 1, characterized in that the set-back portions are formed with the help of overmolding covering all of the coils of the stator while filling the space left between the pole pieces of the stator in part only, whereby the free surface of the overmolding defining the set-back portions forms steps relative to the end surfaces of the pole pieces.

3. An electric machine according to claim 2, characterized in that the electric equipment is constituted by a radial magnetic bearing.

4. An electric machine according to claim 2, characterized in that the electric equipment is constituted by an electric motor.

5. An electric machine according to claim 1, characterized in that it includes overmolding that covers all of the coils of the stator and that is made up to the level of the end surfaces of the pole pieces, with grooves being formed in the overmolding between at least some of said pole pieces so as to form the set-back portions.

6. An electric machine according to claim 5, characterized in that it includes a jacket defining crenellated portions that extend into the slots defined between at least some of the pole pieces so as to form the set-back portions; and the crenellated portions of the jacket are disposed in the grooves formed in the overmolding.

7. An electric machine according to claim 6, characterized in that the jacket is made of an electrically conductive material, and the crenellated portions of the jacket are located in zones corresponding to every other slot amongst the slots formed between the pole pieces.

8. An electric machine according to claim 7, characterized in that the electric equipment is constituted by a radial magnetic bearing.

9. An electric machine according to claim 7, characterized in that the electric equipment is constituted by an electric motor.

10. An electric machine according to claim 1, characterized in that the stator comprises at least two independent sectors that are overmolded and jacketed in independent manner, and in that said set-back portions are formed by empty spaces left between the independent sectors.

11. An electric machine according to claim 10, characterized in that it has four or eight independent sectors defining empty spaces therebetween constituting said set-back portions.

12. An electric machine according to claim 11, characterized in that the electric equipment is constituted by a radial magnetic bearing.

13. An electric machine according to claim 1, characterized in that it includes a jacket defining crenellated portions that extend into the slots defined between at least some of the pole pieces so as to form the set-back portions.

14. An electric machine according to claim 1, characterized in that the electric equipment is constituted by a radial magnetic bearing.

15. An electric machine according to claim 1, characterized in that the electric equipment is constituted by an electric motor.

* * * * *